United States Patent [19]

Johnson

[11] B 4,001,067

[45] Jan. 4, 1977

[54] BUTT WELDER CUTTING ELEMENT TEMPERATURE CONTROL

[75] Inventor: David Emil Johnson, Macedon, N.Y.

[73] Assignee: Mobil Oil Corporation, New York, N.Y.

[22] Filed: Mar. 8, 1973

[21] Appl. No.: 339,446

[44] Published under the second Trial Voluntary Protest Program on February 24, 1976 as document No. B 339,446.

[52] U.S. Cl. .................. 156/159; 156/304; 156/504; 156/507; 156/517; 156/544

[51] Int. Cl.² ............... B31F 5/00; B65H 19/08

[58] Field of Search ......... 156/504, 510, 517, 515, 156/544, 583, 353, 507, 159, 304, 251; 219/243, 56–58, 101; 83/170, 171; 93/19, DIG. 1; 242/58.1

[56] References Cited

UNITED STATES PATENTS

| | | | |
|---|---|---|---|
| 2,707,985 | 5/1955 | Binnall | 156/515 |
| 3,015,600 | 1/1962 | Cook | 156/515 |
| 3,135,077 | 6/1964 | Siegel et al. | 156/515 |
| 3,384,527 | 5/1968 | Fener | 156/515 |
| 3,586,584 | 6/1971 | Wilkins | 156/504 X |
| 3,595,456 | 7/1971 | Rosenthal | 83/171 X |
| 3,721,801 | 3/1973 | Bate | 156/515 X |
| 3,769,124 | 10/1973 | Johnson | 156/504 X |
| 3,834,971 | 9/1974 | Johnson | 156/507 |

Primary Examiner—William A. Powell
Assistant Examiner—M. G. Wityshyn
Attorney, Agent, or Firm—C. A. Huggett; M. G. Gilman; C. A. Malone

[57] ABSTRACT

This invention relates to butt welding sheets of thermoplastic material. More specifically, this invention relates to an apparatus and a process for performing this operation in an improved manner by controlling the temperature of the means used to heat and cut sections of the thermoplastic material. The apparatus and process of this invention concerns switching means response to the length of the cutting means (the length being proportional to the temperature of the cutting means) which controls a power source used to pass current through the cutting means. The current produces heat due to the electrical resistance of the cutting means whenever the cutting means shortens due to a decrease in temperature. An increase of a predetermined amount in length of the cutting means, due to a proportional temperature increase, deactivates the heating circuit. The cutting means temperature control of this disclosure also includes an insulated enclosure having a gate through which the cutting means passes, the gate being comprised of adjacent sections of a flexible material. The enclosure thus conserves heat and inhibits external air currents from contacting and cooling the cutting means.

6 Claims, 5 Drawing Figures

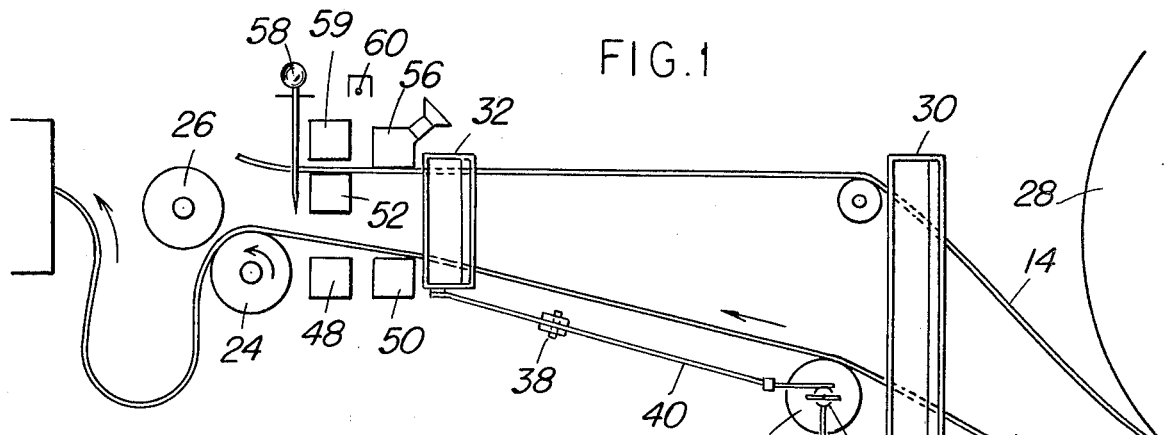
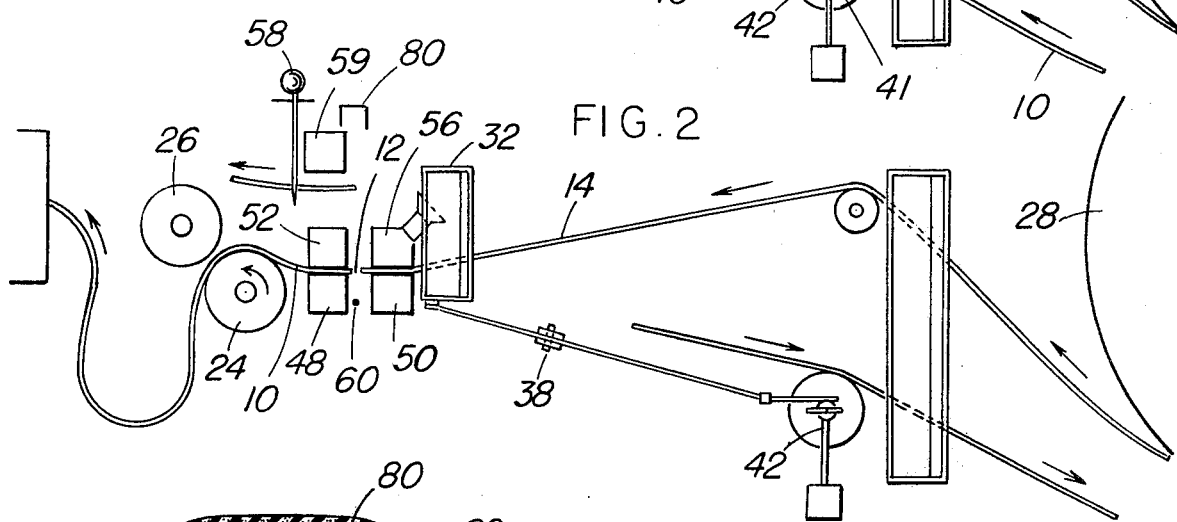
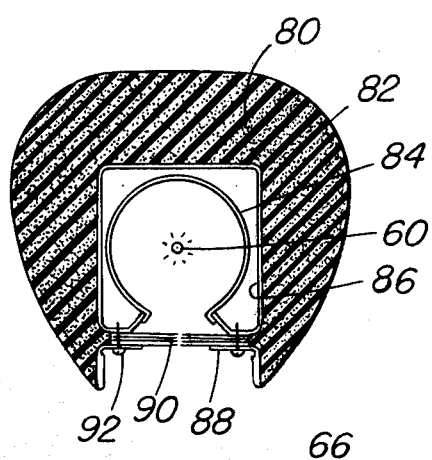
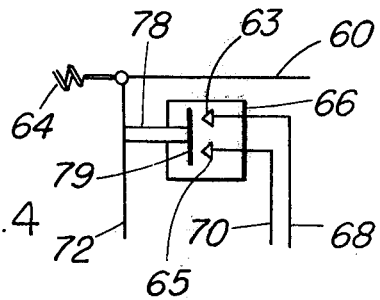
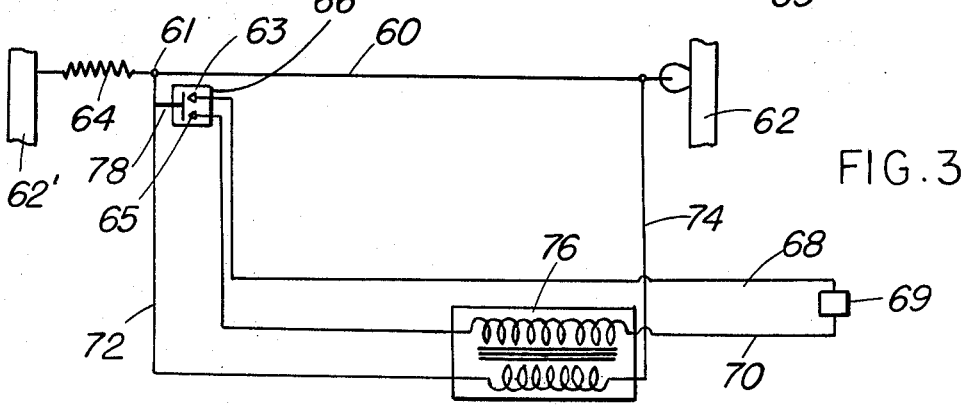

BUTT WELDER CUTTING ELEMENT TEMPERATURE CONTROL

BACKGROUND OF THE INVENTION

1. Field of the Invention

The invention is concerned with butt welding sheets of thermoplastic material.

2. Description of the Prior Art

U.S. Pat. No. 3,769,124 issued Oct. 30, 1973, and U.S. Pat. No. 3,834,971 issued Sept. 10, 1974, described a technique for butt welding the leading edge of one sheet of rolled thermoplastic material to the trailing edge of another sheet of such rolled material. According to these prior applications, the contents of which are hereby incorporated by reference, the leading portion of a sheet of rolled thermoplastic material is transversely severed by contacting it with a moving hot element, the trailing portion of a second sheet of rolled thermoplastic material is also transversely severed by contacting it with further movement of the same hot element; the transversely severed sheet edges, in a heated condition are then butted and thus welded together.

While this process, and the apparatus which is used to carry it out, performs its intended function very well, on occasion it has been found to be difficult to uniformly heat the moving hot element to the proper temperature for the severing and heating, thereby preventing the apparatus from performing properly. Clearly, if the hot element is not heated to a temperature sufficient to cleanly sever the trailing and leading portions, and to heat the sections adjacent to the line of severance to a temperature sufficient to allow them to be butt welded together, the apparatus cannot efficiently carry out the process of butt welding thermoplastic material. Furthermore, if the hot element temperature is not substantially uniform, the severing and heating functions of the element may only be partially performed, as a portion of the element has not reached a sufficiently high temperature to perform these functions. Such a temperature non-uniformly might be caused by the turbulent air flow often present in the environment within which this type of apparatus operates. The varying velocities, temperatures and volumes of such turbulent air flows allow for the non-uniform cooling of the heated element, thus possibly producing an element whose average temperature is of the proper level to perform adequately according to this invention, but whose actual temperature at a given location may not be high enough to perform properly. Furthermore, the element is kept hot for a dwell time following the thermoplastic material severing and heating in order to burn, melt or vaporize off any thermoplastic material buildup. This burn off cannot be performed properly and completely if portions of the hot element are not of sufficiently high temperature.

A primary object of this invention is to control the temperature of a hot moving element so that the element's temperature is sufficient to sever thermoplastic sheets of material by passing the hot moving element through the thermoplastic material. Another objective of this invention is to control the temperature of a hot moving element so that the element's temperature is sufficient to heat thermoplastic material to a temperature sufficient to allow for two sheets thereof to be butt welded together to form a continuous sheet by passing the hot moving element adjacent to the sheets to be so joined. A further objective of this invention is to furnish means to keep the element temperature substantially uniform. Another object of this invention is to prevent the build-up of residual thermoplastic material on the hot moving element. Other and additional objects of this invention will become apparent from a consideration of this entire specification including the claims and drawings.

SUMMARY OF THE INVENTION

According to this invention heating and cutting means, a hot element or wire in the preferred embodiment, used to sever and heat thermoplastic materials has its temperature controlled by measuring the thermal expansion of the element. When the length of an element of given electrical resistance decreases, due to a reduction in temperature, this length reduction causes the element to contact and complete an electrical heating circuit, whereby the heat produced by electrical current flow through the curcuit heats the element. As the element is heated to a predetermined temperature, the element elongates due to thermal expansion and thereby takes itself out of the referred to electrical heating circuit thus ending the flow of electrical current through the element and the heating thereof.

The temperature control device just described, that is length related switching means, controls the average element temperature. As noted above, however, it is possible to have intolerable temperature variation along the length of the element. While the average temperature of this heating element is appropriate, the actual temperature of different parts of this element have been found to sometimes be well below the necessary temperature. An air current may cool one portion of the element and thus force the temperature down at this point while simultaneously forcing the temperature upwards at other portions in order to maintain the average temperature. In order to significantly reduce, and even perhaps entirely prevent temperature non-uniformity, and also to conserve heat and energy, the hot element, according to this invention, is housed in an insulated container which substantially surrounds it except for a gate provided to allow the element to move in and out of the housing into severing relationship with thermoplastic sheets to be acted upon and butt welded together as aforesaid. This gate means may be comprised of adjacent sections of a flexible material positioned so that the cutting element passes between them at the point of their mutual contact. This gate means serves as a flexible closure for the housing thus inhibiting air currents from contacting and cooling the hot element. In this regard it should be noted that the flexible gate should be of a material having a melting and decomposition temperature significantly higher than the hot wire element temperature so as not to be adversely effected by contact with the hot element. In the preferred embodiment the flexible gate means is fabricated from fiberglass cloth.

It should be noted that this invention's temperature control improvement of the electrical conductive heating and cutting means utilized to butt-weld thermoplastic film may be utilized with either a continuous or intermittent thermoplastic sheet material feed means.

BRIEF DESCRIPTION OF THE DRAWINGS

FIG. 1 is a side schematic view, illustrating the prior art.

FIG. 2 is similar to FIG. 1 and shows a schematic view at the point of butt welding.

FIG. 3 is a schematic illustration of the electrical circuit and apparatus of this invention.

FIG. 4 is an enlarged view of the switching portion of FIG. 3.

FIG. 5 is a transverse section through the hot wire element and housing therefor according to this invention.

DESCRIPTION OF SPECIFIC EMBODIMENTS

FIGS. 1 and 2 show the butt splicing process and apparatus of the prior art, a description of which is helpful in understanding the improvement which is the embodiment of this invention. The description of prior art is given as a non-limiting example of a system in which this invention may be employed. It should also be noted that while a particular embodiment of the process of this invention is herein described for purposes of illustration, various modifications and adaptations thereof, which will be obvious to those skilled in the art, may also be made within the spirit of this invention. As illustrated in FIGS. 1 and 2, a first sheet 10 passes through the nip of a pair of rollers 24 and 26 which form an intermittent drive means. A second sheet 14 is fed into the butt splicing means from a new roll 28 thereof. Two pairs of vertical edge guides, 30 and 32 each with matching guides on the opposite side of the sheet (not shown) are spaced upstream and downstream a finite, reasonable distance apart, thus defining the lateral extent of the sheets 10 and 14 between guide pairs. In the illustration of prior art shown in FIGS. 1 and 2, the downstream pair of vertical guides, 32 and its matching guide, are laterally floating. This pair of guides is pivotally 38 connected through a linkage 40 to a guide wheel 42 which is itself pivotally mounted 41 so as to point its direction of rotation proportionally opposite to the lateral float direction of the downstream vertical guide pair.

The first sheet 10 passes over a lower clamp means 48 and 50, and below a frame 52. The second sheet 14 passes over the frame 52 and below a clamp 59 and a vacuum means 56. For temporarily holding the second sheet 14 in a streamwise position without preventing its lateral alignment motion consistent with the position of the vertical guides, a spike 58 is provided to penetrate the second sheet 14. Other temporary holding means can be used to replace this spike.

A resistance wire 60 is provided initially disposed above the second sheet 14 but adapted to pass downwardly through both the second and the first sheets respectively to sever each in substantially identical transverse alignment, and then to pass upwardly past the severed ends. The wire 60 is heated by resistance heating, via current input, sufficient to melt cut the sheets and heat the cut edges enough to permit butt welding thereof.

An embodiment of this invention is illustrated in FIG. 3–5. As shown in FIG. 3, electrical power is provided by means of electrical conductive wires 68 and 70 from a power source 69. In a preferred embodiment, this power is commercially available alternating current of about 120 volts. Other voltages, and/or direct current, might also be utilized.

When the cutting element 60 contracts in length due to a decrease in temperature, it activates a switching means 66 which allows for the passage of electrical current through the cutting element 60. In a preferred embodiment the cutting element 60 is a Ni-Cr (nickel-chromium alloy) wire. The heat produced by the resistance to the passage of current through the cutting element 60 increases the temperature of the cutting element 60. The switching means 66 is calibrated so that it is opened when the cutting element 60 has expanded to a predetermined size corresponding its present desired temperature as determined by its heat of expansion coefficient.

In a preferred embodiment, (see FIG. 4) the switching means 66 closes a primary curcuit when a plate 79 is placed across the contacts 65 and 63 of the switching means 66. The primary circuit is thus made up of a power source 69, a first electrical conductive wire 68, a first contact 63, a plate 79, a second contact 65, and a second electrical conductive wire 70. The closing of this primary curcuit induces a voltage differential in a secondary circuit through means of a transformer 76. In a preferred embodiment, the transformer 76 induces a 24 volt voltage differential across a pair of electrical conductive wires 72 and 74 which are connected to each end of the cutting element 60. The secondary circuit is thus made up of a pair of electrical conductive wires 72 and 74 and the cutting element 60. The switching means 66 is utilized for bringing a plate 79 into and out of contact with contacts 63 and 65 and thereby activating the primary and secondary circuits. In FIGS. 3 and 4 the switching means is illustrated in one of its embodiments by a connector 78 connecting a fixed point 61 at or near the end of the cutting element 60 with a plate 79. The connector 78 is made of an insulator material to prohibit current from flowing from the primary circuit to the secondary circuit. As the point 61 moves with respect to the stationary switching means 66, the plate 79, connected to the point 61 by a connector 78, moves in the corresponding direction. Thus, when the cutting element 60 contracts, plate 79 closes the primary circuit, and when the cutting element expands, plate 79 is removed from the contacts 63 and 65, thus opening the circuit.

The cutting element 60 is attached to a stationary frame 62 at one end, and to a spring 64 at its other end. The spring 64 is in turn attached to a stationary frame 62'. The spring 64 is alternately expanded and compressed as the cutting element 60 contracts and expands respectively, thereby keeping the cutting element taut and straight.

FIG. 5 illustrates a preferred embodiment of this invention wherein a housing is provided for the cutting element 60. In this embodiment, the cutting element 60 is encompassed in succession by an aluminum reflector 84, a steel shell 86, a fiberglass insulation 80, and an aluminum cover 82. The aluminum cover 82 is clamped to the aluminum reflector by means of one or more screws 92 and support members 88. A fiberglass gate of flexible material 90 is provided, held by the support members 88 and a screw 92 at its ends; the gate 90 allowing the cutting element 60 to pass through the flexible material comprising the gate when moving out of the housing into severing and heating relationship with the thermoplastic film sections 10 and 14, as aforesaid, and thereby inhibiting external air currents from contacting the heating and cutting element.

The following example is illustrative of this invention without being limiting upon the scope thereof.

EXAMPLE 1

A Ni-Cr wire 50 inches in length with an expansion coefficient of $76 \times 10^{-7}$ in/in °F. was placed with one of its ends adjacent to a limit switch, the other end being fixed. The limit switch was "triggered" by a wire length decrease of 0.005 in. which corresponds to a temperature decrease of 3.9°F. Activation of the heating circuit was in turn initiated by the limit switch. The heating circuit heated the wire until its length increased by 0.005 in. whereupon the limit switch was again "triggered" thereby deactivating the heating circuit, which had heated the wire 3.9°F above its average temperature prior to heating. The Ni-Cr wire was enclosed in an insulated enclosure, the insulation being made of fiberglass and having a thickness of approximately one half inch. A gate was provided in the enclosure to allow the wire to pass out of and into the enclosure, the gate being made from adjacent sections of flexible fiberglass material, positioned so that the wire passes between them at their point of mutual contact. The fiberglass having a length of approximately one half inch, a melting point of approximately 1400°F and a weight of approximately 4 denier. It is again stated that this example is illustrative of a particular embodiment of this invention and various modifications and adaptions of this embodiment, which would be obvious to those skilled in the art, are considered to be within the spirit and scope of this invention. (It should be noted that the means for temperature control described in this example is based on the average temperature of the entire wire, and not upon the temperature at any one point as is the case when a thermocouple is used.) Calculations confirming the accuracy of the example are set out below:

| | |
|---|---|
| Limit switch travel | = 0.005 inches |
| Coefficient expansion for NiCr wire | = $76 \times 10^{-7} \frac{in}{in\,(°F)}$ |
| Temp. Dif. | = 900°F |
| Wire length | = 50 inches |
| Mechanical multiplier | = 3 |

$0.0000076 \times 50 \times 900 \times 3 = 1.14$ inches (Limit switch control length for wire temperature from 70°F to 970°F)

$$\frac{0.005 \text{ inches}}{1.14 \text{ inches}} = \frac{X}{900}$$

X = 3.9°F   Temperature difference between on and off for the micro switch (limit switch).

$\frac{3.9 \times 100}{900} = 0.44\%$ of range

What is claimed is:

1. In an apparatus comprising means for feeding a first thermoplastic sheet into the nip of a pair of rolls; drive means operating said rolls drawing said first sheet into proximity to said first sheet and said pair of rolls; clamp means associated with said second sheet; clamp means associated with said first sheet; electrical conductive heating and cutting means proximate to said clamp means movably positioned to pass through both said first and said second sheets, thereby severing said first and second sheets; gate means adopted to allow said heating and cutting means to move in and out of a heat insulating enclosure; and means for contacting the thus severed, hot edges for a time sufficient to weld said first and second edges together; the improvement comprising a gate means which comprises adjacent sections of a flexible material adapted to allow said heating and cutting means to pass through said flexible material comprising said gate, thereby preventing residual thermoplastic build-up.

2. An improved apparatus as claimed in claim 1 including a spring extending between one end of said heating and cutting means and a stationary support, thereby producing a spring loading on said heating and cutting means and keeping said heating and cutting means in a taut condition while it elongates and contracts.

3. An improved apparatus as claimed in claim 1 wherein said gate means is comprised of fiberglass cloth.

4. In a process for butt welding transverse edges of two sheets of thermoplastic material by transversely cutting said sheets; aligning the transverse cut edges of said sheets; abutting said transverse cut edges in a heated condition; and contacting said abutted heated edges for a time sufficient to weld such together; wherein said cutting and heating are accomplished by passing a heated transversely positioned electrically conductive heating and cutting means sequentially through said sheets prior to abutting such; returning said heating and cutting means through a gate into an insulated enclosure; the improvement which comprises passing said heating and cutting means through a gate means which comprises adjacent sections of a flexible material adapted to allow said heating and cutting means to pass through said flexible material comprising said gate, thereby preventing residual thermoplastic build-up.

5. An improved process as claimed in claim 4 wherein said gate is comprised of fiberglass cloth.

6. An improved process as claimed in claim 4 wherein said improvement further comprises spring loading said heating and cutting means thereby maintaining such in a taut condition.

* * * * *